Figure 3:
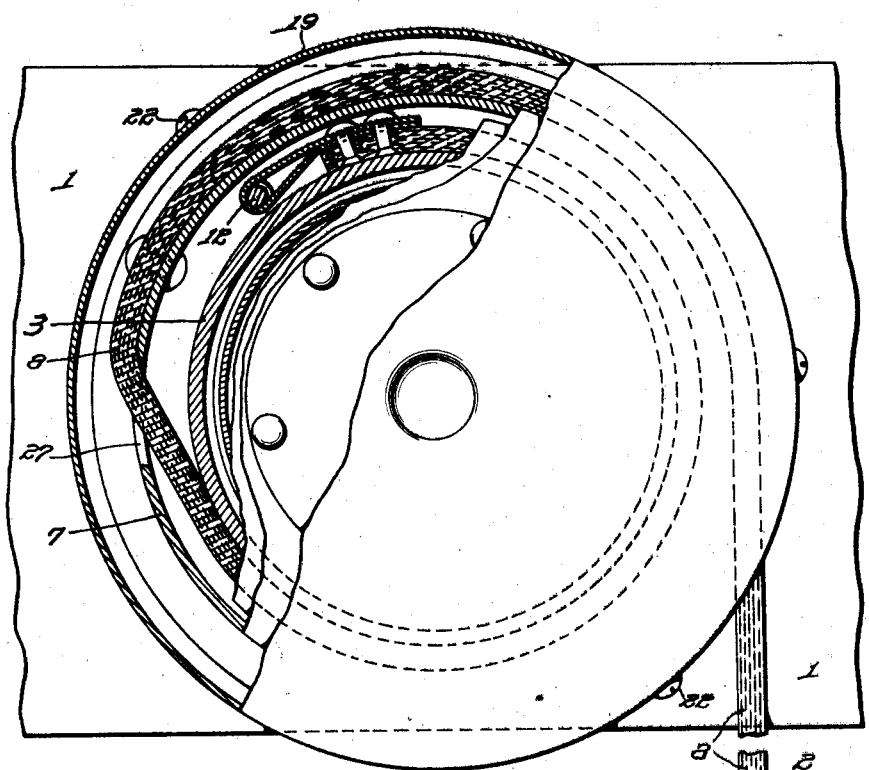

July 12, 1927.  
J. W. WATSON  
MOTION CONTROLLING MECHANISM  
Filed June 6, 1919  
1,635,913  
2 Sheets-Sheet 1
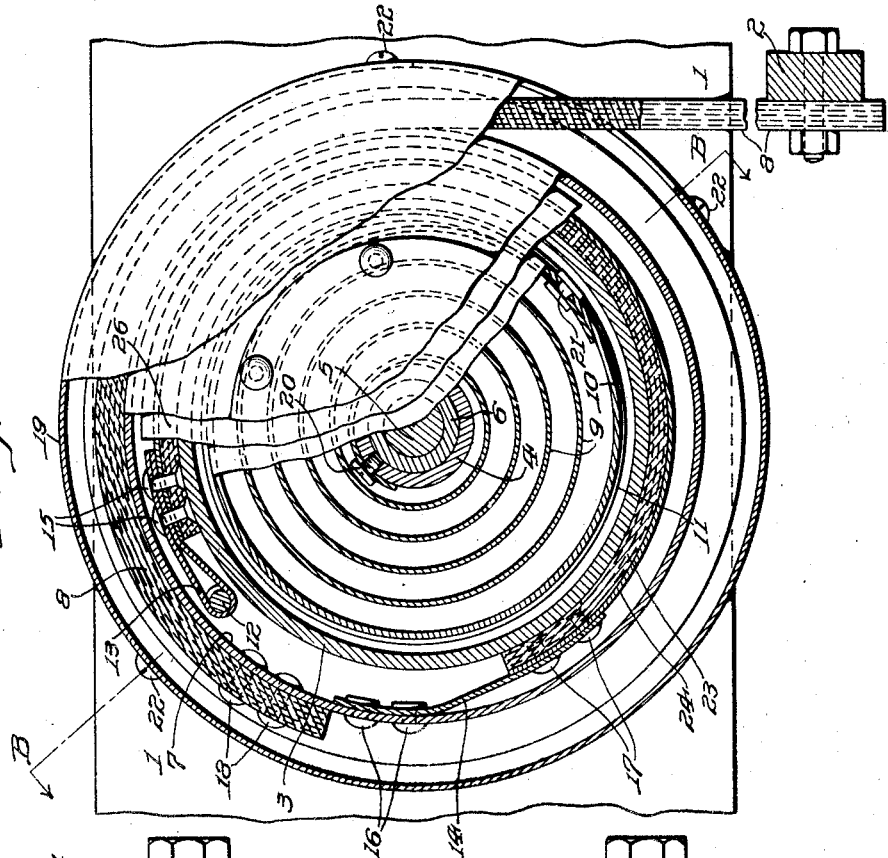
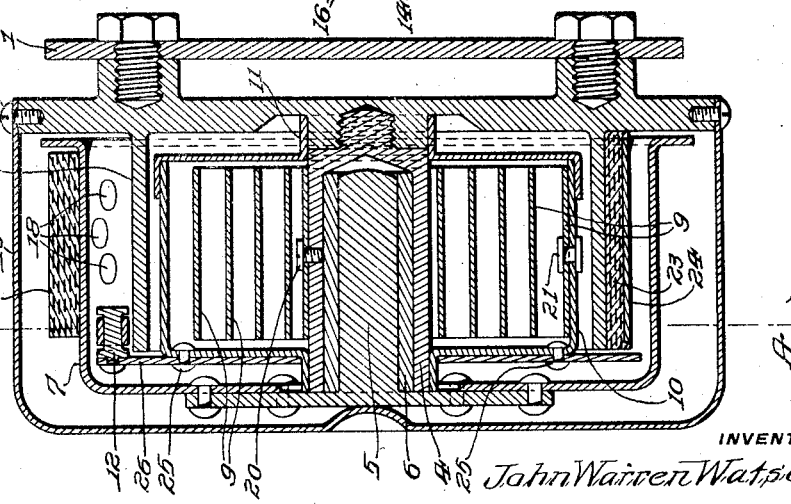
INVENTOR  
John Warren Watson.  
BY Howson & Howson  
ATTORNEYS July 12, 1927.

J. W. WATSON 1,635,913

MOTION CONTROLLING MECHANISM

Filed June 6, 1919

2 Sheets-Sheet 2

INVENTOR
John Warren Watson
BY Howson & Howson
ATTORNEYS

Patented July 12, 1927.

1,635,913

UNITED STATES PATENT OFFICE.

JOHN WARREN WATSON, OF WAYNE, PENNSYLVANIA.

MOTION-CONTROLLING MECHANISM.

Application filed June 6, 1919. Serial No. 302,218.

This invention relates to a novel combination for controlling or regulating relative movement between any two elements, and in particular relates to recoil or rebound checks for motor cars and other vehicles in which it is desired to control and modify the recoil or rebound caused by the action of the springs in tending to assume their normal position after deflection. If desired, my invention may be employed in connection with any other mechanism for the purpose of retarding or controlling relative movement of two bodies in one direction without retarding their relative movement in another direction.

A particular object of my invention is to provide a friction mechanism which is capable of offering a substantially constant resistance to the relative movement of two bodies in one direction throughout a given range of said relative movement.

Another object of my invention is to provide a friction, motion-controlling mechanism which, under all normal conditions of operation, cannot be caused to jam or become locked against operation.

Another object of my invention is to provide a friction mechanism which will not be appreciably affected, in so far as concerns the amount of resistance which the mechanism offers, as wear occurs on the friction members.

Another object of my invention is to provide a mechanism which automatically acts in one direction and which acts in that direction at a speed sufficient to keep pace with any speed which is normally likely to take place between the elements to which certain of the relatively movable members of the mechanism may be respectively attached.

A further object of my invention is to provide a mechanism, for the purpose as stated, including a drum member, adapted to be secured to one of two relatively movable elements, a friction member adapted to be secured to said other relatively movable element, a spring connecting said drum and said friction member, and means connected to said spring, and so associated with other parts of the mechanism as to render said spring subject only to simple winding stresses. By "simple winding stresses" is meant, stresses which are in line with, or which lie wholly within, planes bounding the spring proper and which planes are perpendicular to the axis of the spring. In the embodiments illustrated, this latter means includes the spring box 10, cover 11, and the bearings formed by the outwardly turned flanges at the centers of these two members.

A further object of my invention is to provide a mechanism in which the main spring element is housed or boxed or in some other way maintained within predetermined limits, so that, regardless of the extent to which this spring may be wound up or unwound, it is incapable of exceeding these limits and hence is incapable of rubbing or binding, or in any other way coming in moving contact with, other relatively movable parts of the mechanism. Another object of thus housing, or otherwise maintaining within limits, this necessarily-heavy main spring, is to facilitate the assembling and disassembling of the mechanism.

Another object of my invention is to provide a mechanism simple to construct and which will stand up satisfactorily under the hard usage to which it may be subjected, as, for example, when used in connection with a motor car or other vehicle for the purpose of dampening and controlling the reaction of the vehicle body supporting springs.

Another object of my invention is to provide a mechanism capable of attachment to two relatively movable elements, whose relative movement in one direction it is desired to retard, without necessitating the use of universal joints or other like mechanical means which might tend to wear and to rattle. Such a mechanism has a wide range of use as will be readily apparent to those skilled in the art.

Various combinations of elements and different means could be readily employed to obtain the results secured by the mechanism disclosed without departing from the spirit and scope of this invention, the illustrations being merely by way of example.

One type of this invention is shown by the accompanying drawings in which Figure 1 is a sectional view of one embodiment of this type. Figure 2 is a sectional view, partly in elevation, on line A—A of Figure 1. The sectional view shown in Figure 1 is on the line B—B shown in Figure 2. Both of these sections are looking in the direction as respectively indicated by the arrows.

Figure 4:
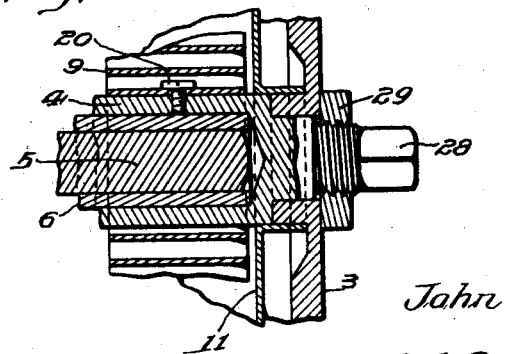

Figure 3 is a view in elevation, partly in section, on the line A—A of Figure 1, but shows a slight modification in the arrangement of some few of the members. Figure 4 is a partial cross section on line B—B of Figure 2, showing a modification providing for external adjusting means. In all four figures, like numbers refer to like parts.

Referring to Fig. 2, 1 and 2 represent relatively movable elements whose motion, one relative to the other, it is desired to check, regulate or control. These elements are illustrated merely diagrammatically for the purpose of indicating that this invention may be applied and utilized in connection with any elements which move, one relative to the other, and whose movement it is desired to effectively control.

A drum member 3 is carried by the element 1 and, securely fixed to the member, by means of a right hand or left hand thread, depending upon the direction of rotation of the other members, is a hollow cylindrical member 4. Rotatable within this member 4 is a flanged stud 5. If desired, for the purpose of minimizing wear or for the purpose of facilitating renewal in the event of wear, a bushing 6 may be interposed between the member 4 and the flanged stud 5. Riveted, or held by other suitable means, to the flanged portion of the stud 5, is a drum-like member 7. While this drum-like member 7 is here illustrated as being circular in section, it may, if desired, be formed with an oval section or a section of some other form for the purpose of providing various different results to suit various applications of the mechanism. Attached to this member 7, as for example, by rivets 18, is shown a flexible member 8 which rides on member 7 and is also secured to element 2. Member 7 also has secured to it, as for example by means of rivets 16, band 14 and rivets 17, a friction member 23 which engages drum member 3. Secured to member 4, as for example by a screw or stud 20, is a spring 9. The other end of spring 9 is secured to spring box 10 by means of stud 21. Spring box 10 is free to rotate on member 4, as is also spring box cover 11 free to rotate on member 4 and on a portion of drum member 3. Secured to member 10, as for example, by rivets 25, is a disc 26. By means of stud 12, which is secured to disc 26, and by means of band 13 and rivets 15, the disc member 26 is secured to friction member 23. Friction member 23 may be provided with a backing 24, as shown, if desired, for the purpose of additional strength or for the purpose of flexibly maintaining any given curvature to member 23. Cover member 19 is secured to drum member 3 by any suitable means, such as, for example, by screws 22. The drum member 3 and the friction member 23 constitute one type of frictionally engaging members, although it is apparent that these members may be made in any other shape than that of a drum or incomplete ring and relatively associated in various other ways than that just described and still incorporate therein the essentials of my invention.

The embodiment of my invention, as illustrated, is so attached to elements 1 and 2 as to retard or control the relative separation of these elements without retarding their relative approach. The operation of the device, as shown in the present instance, may be described as follows:—

Spring 9, which, in assembling, is wound up to any desired tension, is constantly tending to revolve spring box 10 and disc 26 with relation to member 4, and by means of stud 12, band 13 and rivets 15, spring 9 is hence also constantly tending to rotate friction member 23 around drum member 3. This tendency, however, of spring 9 to thus rotate member 23 with relation to drum 3, is resisted by means of flexible member 8 which is secured to element 2 and also to member 23 by means of rivets 18; member 7, rivets 16, band 14 and rivets 17. When, however, elements 1 and 2 are caused to approach each other, this tendency of spring 9, to rotate these parts as above, becomes an action and the parts are thus rotated to whatever extent is permitted by the extent of approach of elements 1 and 2.

When elements 1 and 2 are caused to separate, their separation is resisted by the friction between friction member 23 and drum 3. The operation of this frictional resistance may be explained as follows:—When elements 1 and 2 thus separate, flexible member 8 is made to pull and rotate member 7, which, in turn, through band 14, pulls friction member 23, which, in turn, is resisted at its other end by spring 9 through spring box 10, disk 26, stud 12 and band 13. It will be seen that while spring 9 may be comparatively weak, a relatively much greater force will be required at the other end of member 23 to move this member around drum 3 against the resistance of said spring. Due to the friction and wrapping action between members 23 and 3, any resistance offered by the spring 9 is greatly augmented. There is a direct relation between the strength of spring 9 and the ultimate resistance offered by the mechanism in retarding the separation of elements 1 and 2, but, as stated above, the ultimate resistance, due to the friction and wrapping of member 23 around drum 3, is many times the resistance offered by spring 9 itself.

Figure 3 shows a slight modification over Figures 1 and 2 in that instead of two members 8 and 23, a single member is used by extending member 8 through a slot 27 in member 7 and continuing this flexible member 8 around the drum member 3 and securing it to spring 9 in the same manner as is member 23 secured to spring 9 in the embodiment shown in Figures 1 and 2. Thus, the flexible member 8, in addition to its single pulling function, as shown in Figures 1 and 2, acts also as the friction member bearing against drum 3. If desired, member 8, in this latter form, may be spliced or otherwise joined together and made of different materials in order to provide a material of friction qualities for that portion which comes in contact with drum 3 and a material of suitable tensile strength or non-stretching quality for that portion which does not come in contact with drum member 3.

If desired, some form of external adjusting means may be provided, as, for example, some such construction as shown in Figure 4, in which member 4 extends through a hole in member 3 and can be turned to adjust spring 9 by means of a squared head 28 which is integral with member 4. Any desired adjustment is then held by means of lock nut 29.

As stated above, a particular object of this invention is to provide a mechanism which will present a substantially constant frictional resistance to relative movement of two elements within the normal range of such movement. This is accomplished by providing uniform contact area between friction members 3 and 23, or, as in the embodiment shown in Figure 3, between friction members 3 and 8. It will be noted that this contact area remains constant during any relative movement between elements 1 and 2 within the total working range of the device. The only factor, therefore, which can alter the frictional resistance is the increasing tension of spring 9 as elements 1 and 2 are caused to separate and as spring 9 is consequently more tightly wound. This increase in the tension of spring 9, however, for a given separation of elements 1 and 2, may be made as small as desired by increasing the length of spring 9. It will be readily understood that the increase in tension of spring 9, for any given movement thereof, will be far less if spring 9 is, for example, ten feet long than if spring 9 is, for example, only two feet long. Making spring 9 of ample length, the increase in resistance offered by the mechanism may quite faithfully be said to remain substantially constant throughout the entire working range of the mechanism.

Wear on member 23, shown in Figures 1 and 2, or on member 8, shown in Figure 3, will have very little effect on the resistance offered by the mechanism, as such wear, provided spring 9 is of sufficient length, can only alter the tension of spring 9 by some very negligible amount.

A particular feature of my invention, as here illustrated, lies in combining automatic means for relatively moving the friction members in one direction and non-flexible means (which in the present instance is constituted by the member 7) for maintaining, throughout any relative movement of the friction members within the range of the device in one direction, the same total contacting section, or friction surface, of one of these members in contact with the other, or any partial contacting section, or friction surface, of one of these members in contact with the other.

While I have herein described certain embodiments of my invention with considerable particularity, I do not thereby intend to specifically limit myself thereto, as various changes and modifications may be made in the details of construction and arrangement of the various parts without departing from the spirit and scope of the invention as defined in the appended claims.

Having thus described my invention, what I claim and desire to protect by Letters Patent of the United States is:

1. In mechanism adapted to control relative motion between two elements, a member adapted to be secured to one of said elements, a member revolvable with relation to said first-mentioned member, a flexible member adapted to be secured to said other element and which is wrapped upon said revolvable member and which also frictionally engages said first-mentioned member, and a spring connecting said flexible member to said first-mentioned member.

2. In mechanism for retarding motion between two relatively movable elements, a drum adapted to be secured to one of said elements, a member revolvable with relation to said drum, a friction member in contact with said drum and connected to said revolvable member and a spring for relatively revolving said friction member and said revolvable member around said drum and which also causes said friction member to grip said drum.

3. In mechanism for retarding motion between two relatively movable elements, a drum adapted to be secured to one of said elements, a friction member in contact with said drum and adapted to be connected to said other element, a member journalled with relation to and revolvable around said drum, and a spring connecting said drum and said friction member, the connection of said spring to said friction member being independent of said revolvable member.

4. In mechanism for retarding motion between two relatively movable elements, a drum adapted to be secured to one of said elements, a friction member in contact with said drum and adapted to be secured to said other element, a spring connected to said drum and to said friction member, and means independent of said drum and said friction member for maintaining said spring within pre-determined limits regardless of the extent to which said spring may be wound up or unwound.

5. In mechanism for retarding motion between two relatively movable elements, a drum adapted to be secured to one of said elements, a friction member in contact with said drum and adapted to be secured to said other element, a spring connected to said drum and to said friction member, and means independent of said drum and said friction member for maintaining an end portion of said spring out of rubbing contact with other parts of the mechanism.

6. In mechanism for retarding motion between two relatively movable elements, a drum adapted to be secured to one of said elements, a friction member in contact with said drum and adapted to be secured to said other element, a spring connected to said drum and to said friction member, and means independent of said drum and said friction member for so transmitting the power of said spring as to subject the spring to no lateral twisting stresses.

JOHN WARREN WATSON.